No. 644,855. Patented Mar. 6, 1900.
M. W. FORSTER.
DEVICE FOR REMOVING WASTE PRODUCTS.
(Application filed Jan. 12, 1899.)
(No Model.)
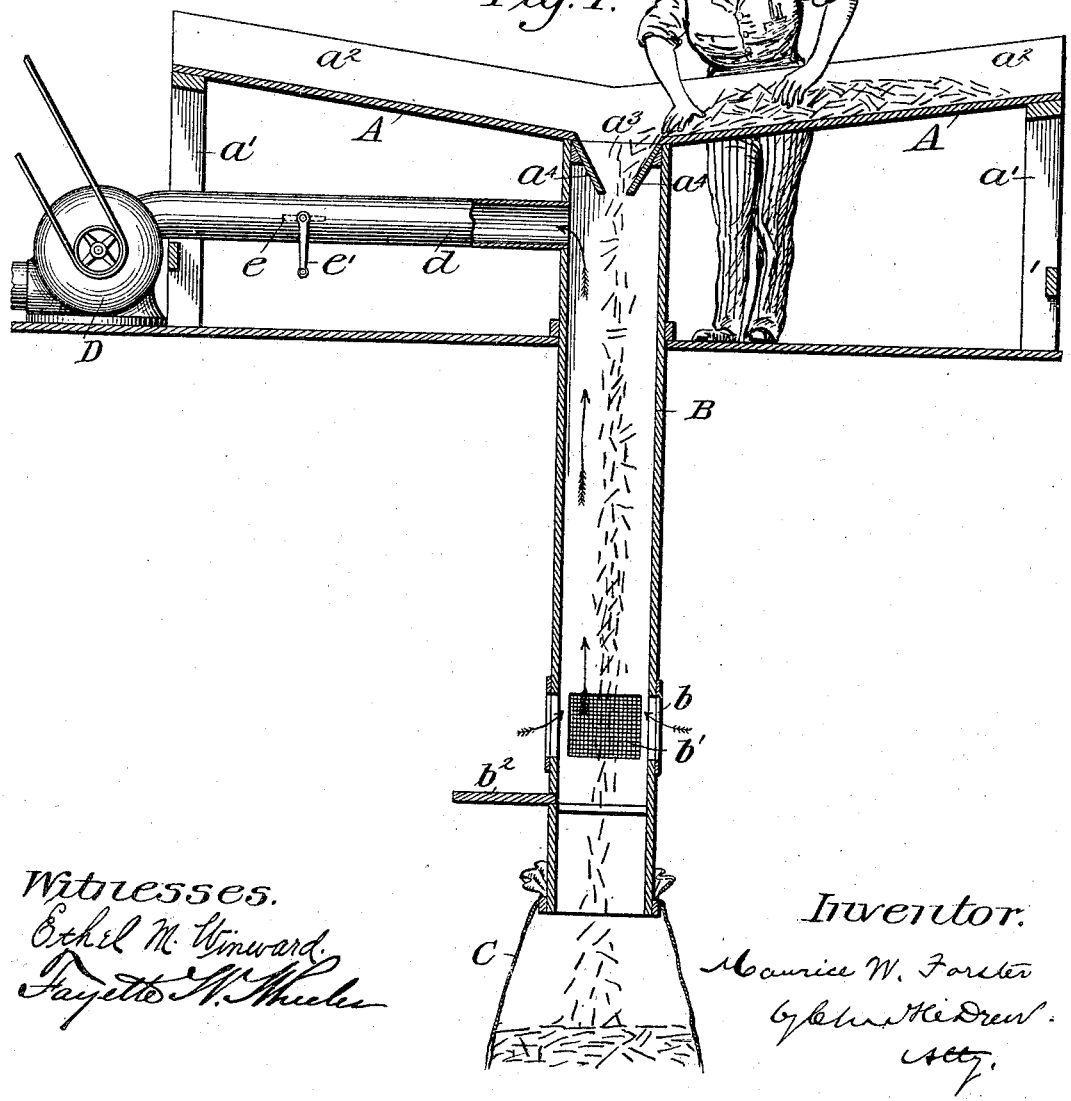
Witnesses.
Ethel M. Winward.
Fayette N. Wheeler.
Inventor.
Maurice W. Forster
by Chas. N. Kedrew
Atty.

UNITED STATES PATENT OFFICE.

MAURICE W. FORSTER, OF STRONG, MAINE, ASSIGNOR TO CHARLES FORSTER, OF PORTLAND, MAINE.

DEVICE FOR REMOVING WASTE PRODUCTS.

SPECIFICATION forming part of Letters Patent No. 644,855, dated March 6, 1900.

Application filed January 12, 1899. Serial No. 701,914. (No model.)

*To all whom it may concern:*

Be it known that I, MAURICE W. FORSTER, of Strong, in the county of Franklin, State of Maine, have invented certain new and useful Improvements in Devices for Removing Waste Products in the Manufacture of Small Wooden Articles, of which the following is a specification.

In the manufacture of match-splints, toothpicks, and other small articles from wood dust and splinters are produced which it is desirable to remove from the splints or picks. This cleaning operation has heretofore, so far as known to me, been effected by allowing the splints to fall by gravity through a continuous blast of air which is directed across the path of the splints, the blast being supposed to carry off to one side all splinters and dust, while the heavier splints continue their downward course. In practice, however, this transverse blast is not effective, for if the blast is strong enough to carry the waste products away it is likely to take with it some of the blanks and splints, and if it is weaker, so as not to affect the latter, it will not properly act upon the waste.

This invention has for its object to construct an apparatus for cleaning match-splints, toothpicks, and similar articles which shall not have the objections referred to; and it consists of an apparatus having a chute through which the splints are caused to pass, they being fed into said chute at one end thereof and discharged from the other end into a suitable receptacle located at said discharge end, and means are provided whereby a continuous current of air is caused to pass through said chute in a direction opposite to the path of the splints through said chute, and said current serves to arrest and carry off through the suction-pipe leading to the blower all dust or splinters which are lighter than the splints, while the heavier splints will continue in the opposite direction, and thereby become separated from the particles which it is desired to remove.

Other features of this invention are hereinafter set forth.

In the following description reference is had to the accompanying drawings, in which—

Figure 1 is an elevation, shown partly in section, of an apparatus embodying this invention. Fig. 2 is a plan view of the upper portion of Fig. 1.

A represents a table, which is shown as supported at each end by means of legs $a'$ $a'$ and as having side boards $a^2$ $a^2$, and upon said table are deposited the splints to be cleaned.

An opening $a^3$ is formed or provided through the table A, and said opening communicates with the upper end of a vertically-arranged chute B. The top of the table A inclines or slopes toward the opening $a^3$ and is formed or provided with downwardly-projecting portions $a^4$, which extend into the upper end of the chute B and partly close said end, so as to leave a comparatively-narrow opening $a^5$, through which the splints are fed by hand or otherwise into the chute B, through which latter they fall by gravity and are discharged at the lower end thereof into a bag C or other suitable receptacle conveniently placed to receive them.

During the passage of the splints through the chute they are subjected to the influence of a continuous current of air passing upwardly through said chute, and all splinters and dust which are lighter than the splints will be carried upwardly by said current of air and separated from the splints, while the latter will continue their downward course.

As a means for establishing a continuous current of air through the chute B a fan D is herein shown as connected with the interior chamber of the chute B, near the upper end thereof, by means of a pipe $d$, which serves as an outlet for the air and through which the splinters and dust are conducted or carried off from the chute B. The chute B is formed or provided near its lower end with openings $b$, which serve as inlets for the air, which is caused by means of the fan D to pass in through said openings and up through the chute, as indicated by the arrows in Fig. 1, the openings $b$ being covered over with wire netting or gauze $b'$ to prevent the splints from falling therethrough.

By means of a slide $b^2$, located below the openings $b$, the discharge end of the chute B may be closed while removing the receptacle C or when desired.

The force of the current of air through the pipe $d$ may be regulated by the damper or valve $e$, provided with the arm $e'$, by means of which the pipe $d$ may be partially or wholly closed.

What I claim is—

In an apparatus for removing waste products in the manufacture of wooden articles, the combination of the table A, provided with an opening $a^3$, the downwardly-projecting portion $a^4$, the chute B, having openings $b$, covered with wire netting or gauze $b'$, the slide $b^2$, the outlet-pipe $d$, and the fan D, substantially as, and for the purpose, above described.

MAURICE W. FORSTER.

Witnesses:
M. LOUISE SMITH,
CHAS. H. DREW.